United States Patent Office 3,139,431
Patented June 30, 1964

3,139,431
6-(5-NITRO-2-FURYL)AZAURACIL
Kenyon J. Hayes, Norwich, N.Y., assignor to The Norwich Pharmacal Company, Norwich, N.Y., a corporation of New York
No Drawing. Filed Feb. 23, 1960, Ser. No. 10,049
1 Claim. (Cl. 260—248)

This invention relates to the new nitrofuran, 6-(5-nitro-2-furyl)azauracil, represented by the formula:

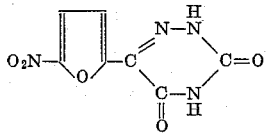

to the preparation thereof, and to a new chemical compound, 6-(2-furyl)azauracil, represented by the formula:

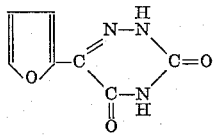

useful as an intermediate in the preparation of said nitrofuran.

I have discovered that my new nitrofuran is inimical in small amounts to a variety of microorganisms under the serial dilution technique, as shown in the following table.

| Microorganism: | Minimum inhibiting concentration in mg. percent |
|---|---|
| Streptococcus pyogenes | 0.2 |
| Staphylococcus aureus | 3.0 |
| Salmonella typhosa | 3.0 |
| Escherichia coli | 0.4 |
| Salmonella choleraesuis | 6.0 |
| Pasteurella avicida | 2.0 |
| Erysipelothrix rhusiopathiae | 0.8 |

My new nitrofuran is not restricted to in vitro antimicrobial effects. I have found that it exerts systemic activity when administered in far less than toxic amount to animals. Mice lethally infected with *Salmonella typhosa* are protected; a total dose of 210 mg./kg. in increments of 70 mg./kg. spaced at 0.5, 4.5 and 8 hours post infection serves to spare 70% without manifesting any toxic effect on the host.

I have also found that my new nitrofuran is remarkably resistant to metabolic destruction when ingested by animals; appearing in the urine in the amount of about 53% of the administered dose. Such urine shows antibacterial activity against many organisms associated with urinary tract infections.

Another valuable characteristic which is exhibited by my new nitrofuran is the relative absence of emetic properties upon oral administration, this permits more flexible dosage without incurring the rejection due to regurgitation; a response manifested by a sizeable percentage of sensitive subjects to which other drugs of this type have been administered. A dose of 100 mg./kg. administered to dogs, a very emetic-sensitive species, produces vomiting in only about 50%, a relatively high tolerance at such drug dosage level.

My new nitrofuran is readily adapted to pharmaceutical compounding and formulation in various forms such as tablets, suspensions, lozenges, capsules and the like in accordance with conventional practice in the art.

The method which I use to prepare my new nitrofuran comprises the nitration of the new compound, 6-(2-furyl)-azauracil, which I have found to be a particularly valuable synthetic intermediate. As nitrants, those acids and mixtures of acids and anhydrides may be used which are known to accomplish furan nitration without damage to the furan nucleus. Among these are mixtures of fuming or concentrated nitric acid and acetic anhydride and/or acetic acid and sulphuric acid. In the case of a concentrated nitric acid-acetic anhydride nitrating mixture the sulphuric acid may be present in catalytic amount.

The nitrated compound can be readily recovered from the nitration mixture by filtration in accordance with conventional isolation procedures.

The method which I prefer to follow consists in treating the semicarbazone of 2-furoyl formic acid with an alkaline agent such as sodium ethoxide, in an inert medium and under the influence of heat, to effect cyclization. The intermediate thus produced is nitrated with a mixture of nitric acid and acetic anhydride containing a catalytic quantity of sulfuric acid and the nitro compound, 6-(5-nitro-2-furyl)azauracil, is recovered from the reaction mixture by treating it with a base, quenching and filtering.

In order that my invention may be readily available to those skilled in the art the following illustrative example is given:

EXAMPLE

A. 2-Furoyl Formic Acid

Forty four grams of 2-furoyl cyanide is hydrolysed with concentrated hydrochloric acid at room temperature to crude 2-furoyl formic acid by the method of Fischer, Ber. 46,892 (1913). The crude acid is dissolved in 50 ml. of ethanol and added to a solution of 44 gms. of semicarbazide hydrochloride in 450 ml. of water. The 2-furoyl formic acid semicarbazone precipitates rapidly and is collected and dried. The semicarbazone may be purified by charcoaling in a solution of 100 ml. of concentrated ammonium hydroxide in 1500 ml. of water followed by precipitation with 100 ml. of concentrated hydrochloric acid. The white solid is collected, washed with water and dried at 110° C.; yield—33 gms.; melting point 191° C. (dec.).

B. 6-(2-Furyl)Azauracil

Twenty grams of the 2-furoyl formic acid semicarbazone of (A) in 450 ml. of propylene glycol is treated with a solution of sodium ethoxide prepared by dissolving 7.5 gms. of metallic sodium in 150 ml. of ethanol. The solution is refluxed for twenty-four hours after which the solvents are removed by distillation in vacuo. The residual yellow solid is dissolved in 110 ml. of hot water and acidified with 30 ml. of concentrated hydrochloric acid. The solid is collected, washed well with water and dried at 75° C. to constant weight giving 16.1 gms.; melting point 308° C. (uncorrected, sealed tube), of white 6-(2-furyl)-azauracil.

C. 6-(5-Nitro-2-Furyl)Azauracil 6-(2-furyl)azauracil (7.2 gms.) prepared in (B) is added in small increments, so as to maintain the temperature at 25–30° C., to a nitration mixture prepared by admixing 8.4 ml. 70% nitric acid containing two drops of concentrated sulfuric acid to 38 ml. of acetic anhydride. After one hour at 25–30° C. the nitration mixture is treated with 18 gms. of anhydrous potassium acetate. The mixture is held at 45–50° C. for one-half hour. The suspension is poured into 250 ml. of cold water. The light yellow solid is filtered, washed with water and dried at 110° C. to constant weight. The yield of 6-(5-nitro-2-furyl)azauracil is 6.4 gm.; melting point 318–319° C. (uncorrected; sealed tube). It may be recrystallized from a 1:5 mixture of dimethylformamide nitromethane; then from acetonitrile.

|  | C, percent | H, percent | N, percent |
|---|---|---|---|
| Calc'd | 37.51 | 1.80 | 25.00 |
| Found | 37.71 | 1.92 | 24.80 / 24.88 |

What I claim is:

The compound 6-(5-nitro-2-furyl)azauracil represented by the formula:

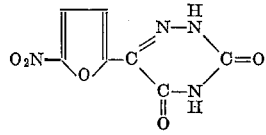

References Cited in the file of this patent

FOREIGN PATENTS

| 203,011 | Austria | Apr. 25, 1959 |
| 1,040,217 | France | May 20, 1953 |
| 860,949 | Germany | Dec. 29, 1952 |
| 705,609 | Great Britain | Mar. 17, 1954 |
| 288,888 | Switzerland | June 1, 1953 |

OTHER REFERENCES

Dunlop et al.: The Furans, pp. 152 to 164, Reinhold Pub. Corp., N.Y. (1953).

Erickson et al.: "The 1,2,3- and 1,2,4-Triazines, Tetrazines and Pentazines," pp. 76 to 84, Interscience Pub. Inc., N.Y. (1956).

Derwent: Belgian Patents Report, vol. 53B, p. A10 (abstract of Belgian Patent 574,948, published May 16, 1959).